US012090552B2

(12) United States Patent
Löwgren et al.

(10) Patent No.: US 12,090,552 B2
(45) Date of Patent: Sep. 17, 2024

(54) METHOD AND DEVICE FOR ADDITIVE MANUFACTURING

(71) Applicant: ARCAM AB, Mölnlycke (SE)

(72) Inventors: Lars Löwgren, Hällingsjö (SE); Kristofer Karlsson, Kungsbacka (SE)

(73) Assignee: ARCAM AB, Mölnlycke (SE)

( * ) Notice: Subject to any disclaimer, the term of this patent is extended or adjusted under 35 U.S.C. 154(b) by 918 days.

(21) Appl. No.: 17/079,975

(22) PCT Filed: Feb. 26, 2019

(86) PCT No.: PCT/EP2019/054710
§ 371 (c)(1),
(2) Date: Oct. 26, 2020

(87) PCT Pub. No.: WO2019/206496
PCT Pub. Date: Oct. 31, 2019

(65) Prior Publication Data
US 2021/0245253 A1  Aug. 12, 2021

Related U.S. Application Data

(60) Provisional application No. 62/741,870, filed on Oct. 5, 2018, provisional application No. 62/663,622, filed on Apr. 27, 2018.

(51) Int. Cl.
*B22F 12/20* (2021.01)
*B22F 10/28* (2021.01)
(Continued)

(52) U.S. Cl.
CPC .......... *B22F 12/50* (2021.01); *B22F 10/28* (2021.01); *B22F 12/20* (2021.01); *B22F 12/224* (2021.01);
(Continued)

(58) Field of Classification Search
None
See application file for complete search history.

(56) References Cited

U.S. PATENT DOCUMENTS

2008/0128956 A1  6/2008  Perret
2009/0035411 A1  2/2009  Seibert et al.
2018/0111198 A1  4/2018  Vitanov et al.

FOREIGN PATENT DOCUMENTS

CN  106163703 A  11/2016
CN  106536165 A  3/2017

OTHER PUBLICATIONS

Chinese office action for application 201980028143.4 mail date Apr. 6, 2022 (26 pages with English Translation).
(Continued)

*Primary Examiner* — Anthony M Liang
(74) *Attorney, Agent, or Firm* — Dinsmore & Shohl LLP

(57) ABSTRACT

Provided is an additive manufacturing apparatus for additive manufacturing of three dimensional objects by selectively solidifying a powder material layer by layer in a process chamber, wherein the apparatus comprises a powder distributor movable across a build area of a build tank for applying a layer of powder material thereon and a solidification device for selectively solidifying the applied powder layer at positions corresponding to a cross section of the object to be manufactured and a control unit adapted to repeat the steps of applying and selectively solidifying until the object is completed, wherein at least one support structure for supporting the powder distributor and/or a bellows assembly associated there-with is connectable to a cooling/heating media supply outside the process chamber and the support structure and/or the bellows assembly is adapted for transporting the cooling/heating media to and from the powder distributor. Certain embodiments further or alternatively include a bellows assembly connected or connectable
(Continued)

to a cooling/heating media supply positioned outside the process chamber, the bellows assembly being configured for transporting the cooling/heating media to and from the powder distributor.

19 Claims, 7 Drawing Sheets

(51) Int. Cl.
| | | |
|---|---|---|
| | *B22F 10/30* | (2021.01) |
| | *B22F 12/00* | (2021.01) |
| | *B22F 12/50* | (2021.01) |
| | *B22F 12/60* | (2021.01) |
| | *B33Y 10/00* | (2015.01) |
| | *B33Y 30/00* | (2015.01) |
| | *B33Y 50/02* | (2015.01) |
| | *B22F 12/30* | (2021.01) |
| | *B22F 12/90* | (2021.01) |

(52) U.S. Cl.
CPC ............ *B22F 12/226* (2021.01); *B22F 12/60* (2021.01); *B33Y 10/00* (2014.12); *B33Y 30/00* (2014.12); *B33Y 50/02* (2014.12); *B22F 12/30* (2021.01); *B22F 12/90* (2021.01)

(56) References Cited

OTHER PUBLICATIONS

International Search Report and Written Opinion issued May 23, 2019 for PCT/EP2019/054710 (19 pages).

METHOD AND DEVICE FOR ADDITIVE MANUFACTURING

BACKGROUND

Related Field

The invention relates to a method and a device for powder bed fusion additive manufacturing.

Description of Related Art

Freeform fabrication or additive manufacturing (AM) using electron beam melting (EBM) or laser beam melting is a method for forming a solid three-dimensional article from a powder. The three-dimensional article is formed layer by layer by successive fusion of selected areas of powder layers, which selected areas correspond to successive layers of the three-dimensional article. A layer of powder, such as metal powder, is deposited on a build area and an electron beam or a laser beam is used to selectively melt the powder layer of the build area. The melted material fuses with underlaying layers and solidifies to form the top layer of the solid three-dimensional article. A further layer of powder is deposited onto the previous layer, and the electron or laser beam is used to selectively melt the further powder layer of the build area. The melted material solidifies and form another solid layer fused onto the previous solid layer. This process is repeated for multiple layers until the desired 3D geometry of the article is achieved.

An apparatus for forming such a three-dimensional article may have a build table on which the three-dimensional article is to be formed, a powder distributor for delivering powder to the build table (build area) for the formation of the powder layers and an electron beam source or a laser beam source for providing the energy beam used for melting the powder. The build table is arranged in a build tank which in turn is arranged in a process chamber formed by a casing. When using EBM, the build chamber is a vacuum chamber.

A powder layer is created by first distributing a predetermined amount of powder onto the build table by a powder distributor. Thereafter the powder distributor may again be moved over the build table one or several times in order to even out any powder surface irregularities. A non-even thickness of the powder material to be fused is a problem since a finished three-dimensional article will lose dimension stability and/or having reduced mechanical properties. Another problem with bad quality of powder layer application is that a powder distribution or powder layer smoothening have to be performed multiple times in order to reach a desired result. This multiple powder application/smoothening takes time and may affect the local temperature of the build since heat may disappear from the build during the process. This may mean that more power needs to be provided into the build compared to a single powder application process.

SUMMARY

An object of the invention is to provide a device which provides for a shorter additive manufacturing process which at the same time provides for a more accurate powder distribution in an additive manufacturing.

The object is achieved by an additive manufacturing apparatus for additive manufacturing of three dimensional objects by selectively solidifying a powder material layer by layer in a process chamber, wherein the apparatus comprises a powder distributor movable across a build area of a build tank for applying a layer of powder material thereon and a solidification device for selectively solidifying the applied powder layer at positions corresponding to a cross section of the object to be manufactured and a control unit adapted to repeat the steps of applying and selectively solidifying until the object is completed, wherein at least one support structure for supporting the powder distributor is connectable to a cooling/heating media supply outside the process chamber and the support structure is adapted for transporting the cooling/heating media to and from the powder distributor.

An exemplary advantage of the present invention is that the powder distributor may be kept at a more constant temperature which means that the shape of the powder distributor may be more or less constant. Another exemplary advantage of the present invention is that the powder distributor may be in a safer place for a detector or sensor for sensing temperature or topographic variations of the powder layer surface. Still another exemplary advantage of the present invention is that a powder distributor which is cooled and/or heated internally may have a reduced risk of stuck powder particles on its outer surface. The reason for that is that it has a lower temperature than a non-cooled powder distributor. Yet another exemplary advantage of the present invention is that a temperature controlled powder distributor may be better controlled with respect to temperature variating mechanical issues such as expansion and/or contraction due to different temperatures of the powder distributor in different occasions.

In one example embodiment of the present invention the support structure for supporting the powder distributor is having at least a first portion inside the process chamber connected to the powder distributor and at least a second portion outside the process chamber connectable to the cooling/heating media supply.

An exemplary advantage of at least this exemplary embodiment is that there are no flexible parts of the cooling/heating channels inside the process chamber. This is preferable to have any such parts outside the process chamber when the process chamber is a vacuum chamber. This also gives the possibility to hide any electrical wires to any sensor/detector attached to the powder distributor inside the support structure.

In still another example embodiment of the present invention the support structure is arranged to be moved back and forth for moving the powder distributor over the build area back and forth along a straight line.

An exemplary advantage of at least this exemplary embodiment is that the powder distribution may very stable and precise since most of the support structure may be kept outside the process chamber when not in use. The little exposure to heat in combination with cooling/heating allows for a mechanically stable design.

In yet another example embodiment of the present invention the support structure is arranged to be rotated for rotating the powder distributor over the build area.

An exemplary advantage of at least this exemplary embodiment is that the support structure may be supported at both its and outside the process chamber thereby keeping the support out of the influence of the heat from the manufacturing process.

In another aspect of the invention it is provided a method for additive manufacturing of three-dimensional objects by selectively solidifying a powder material layer by layer in a process chamber, the method comprising the steps of:

a. applying a layer of powder material within a build area of a build tank by means of a powder distributor moving across the build area,
b. selectively solidifying the applied powder material in the build tank at positions corresponding to a cross-section of the object to be manufactured, by means of a solidification device,
c. repeating the steps of applying and selectively solidifying until the object is completed, the method further comprising the steps of
d. connecting a cooling/heating media supply provided outside of the process chamber to a at least one support structure for supporting the powder distributor where the support structure is adapted for transporting the cooling/heating media to and from the powder distributor.

An exemplary advantage of at least this exemplary embodiment is that the powder distributor may be kept at a more constant temperature which means that the shape of the powder distributor may be more or less constant. Another exemplary advantage of at least this exemplary embodiment is that the powder distributor may be a safer place for a detector or sensor for sensing temperature or topographic variations of the powder layer surface. Still another advantage of the present invention is that a powder distributor which may be cooled internally may have a reduced risk of stuck powder particles on its outer surface. The reason for that is that it has a lower temperature than a non-cooled powder distributor. Yet another exemplary advantage of the present invention is that the cooled/heated powder distributor may be used as a cooling/heating means for the top surface of the three-dimensional article. This may in some cases reduce the manufacturing time when the three-dimensional build needs to be cooled down for some reason.

In another example of the method for additive manufacturing the method further comprising the steps of:
providing a first portion of the support structure connectable to the powder distributor inside the process chamber,
providing a second portion of the support structure connectable to the cooling/heating media supply outside the process chamber.

An exemplary advantage of at least this exemplary embodiment is that the cooling/heating media supply may be attached to flexible transfer hoses/pipes outside the process chamber. The transfer of cooling/heating media inside the process chamber takes place in rigid transfer pipes inside the support structure.

In another example embodiment of the present invention a bellows assembly may be provided adjacent to and/or substantially enclosing the support structure that supports the powder distributor. In certain embodiments the bellows assembly may be provided without an accompanying support structure. In these and other embodiments, the bellows assembly is configured to—external to any provided support structure—transport cooling/heating media to and from a powder distributor. The bellows assembly may be a vacuum bellow and/or configured to translate (e.g., via an actuator) so as to move the powder distributor in a desirable manner.

According to various exemplary embodiments, there may be provided an additive manufacturing apparatus for additive manufacturing of three dimensional objects by selectively solidifying a powder material layer by layer in a process chamber, the apparatus comprising: a powder distributor movable across a build area of a build tank and configured for applying a layer of powder material thereon; a solidification device configured for selectively solidifying the applied powder layer at positions corresponding to a cross section of the object to be manufactured; a control unit adapted to manipulate the powder distributor and the solidification device to repeat the steps of applying and selectively solidifying until the object is completed; at least one support structure configured for supporting the powder distributor; and a bellows assembly connected or connectable to a cooling/heating media supply positioned outside the process chamber, the bellows assembly being configured for transporting the cooling/heating media to and from the powder distributor.

In an analogous manner, a method may also be provided for additive manufacturing of three-dimensional objects by selectively solidifying a powder material layer by layer in a process chamber, the method comprising the steps of:
a. applying a layer of powder material within a build area of a build tank by means of a powder distributor moving across the build area,
b. selectively solidifying the applied powder material in the build tank at positions corresponding to a cross-section of the object to be manufactured, by means of a solidification device,
c. repeating the steps of applying and selectively solidifying until the object is completed, and
d. connecting a cooling/heating media supply provided outside of the process chamber to at least one bellows assembly coupled to the powder distributor where the bellows assembly is adapted for transporting the cooling/heating media to and from the powder distributor.

In these and still other exemplary embodiments, there may be provided an additive manufacturing apparatus for additive manufacturing of three dimensional objects by selectively solidifying a powder material layer by layer, the apparatus comprising a process chamber comprising: a powder distributor movable across a build area of a build tank and configured for applying a layer of powder material thereon; a control unit adapted to manipulate the powder distributor until the object is completed; a first portion of at least one support structure configured for supporting the powder distributor; and a bellows structure substantially enclosing the support structure and configured for transporting cooling/heating media to and from the powder distributor. Separately, outside the process chamber is provided: a cooling/heating media supply containing the cooling/heating media; and a second portion of the at least one support structure.

Certain methods for additive manufacturing of three-dimensional objects by selectively solidifying a powder material layer by layer in a process chamber, as described herein, may be computer-implemented, in part or totality. Associated computer program products comprising at least one non-transitory computer-readable storage medium having computer-readable program code portions embodied therein are also provided.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS

Various embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

Still further, to facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "three-dimensional structures" and the like as used herein refer generally to intended or actually fabricated three-dimensional configurations (e.g., of structural material or materials) that are intended to be used for a particular purpose. Such structures, etc. may, for example, be designed with the aid of a three-dimensional CAD system.

The term "electron beam" as used herein in various embodiments refers to any charged particle beam. The sources of charged particle beam can include an electron gun, a linear accelerator and so on.

Figure 1:
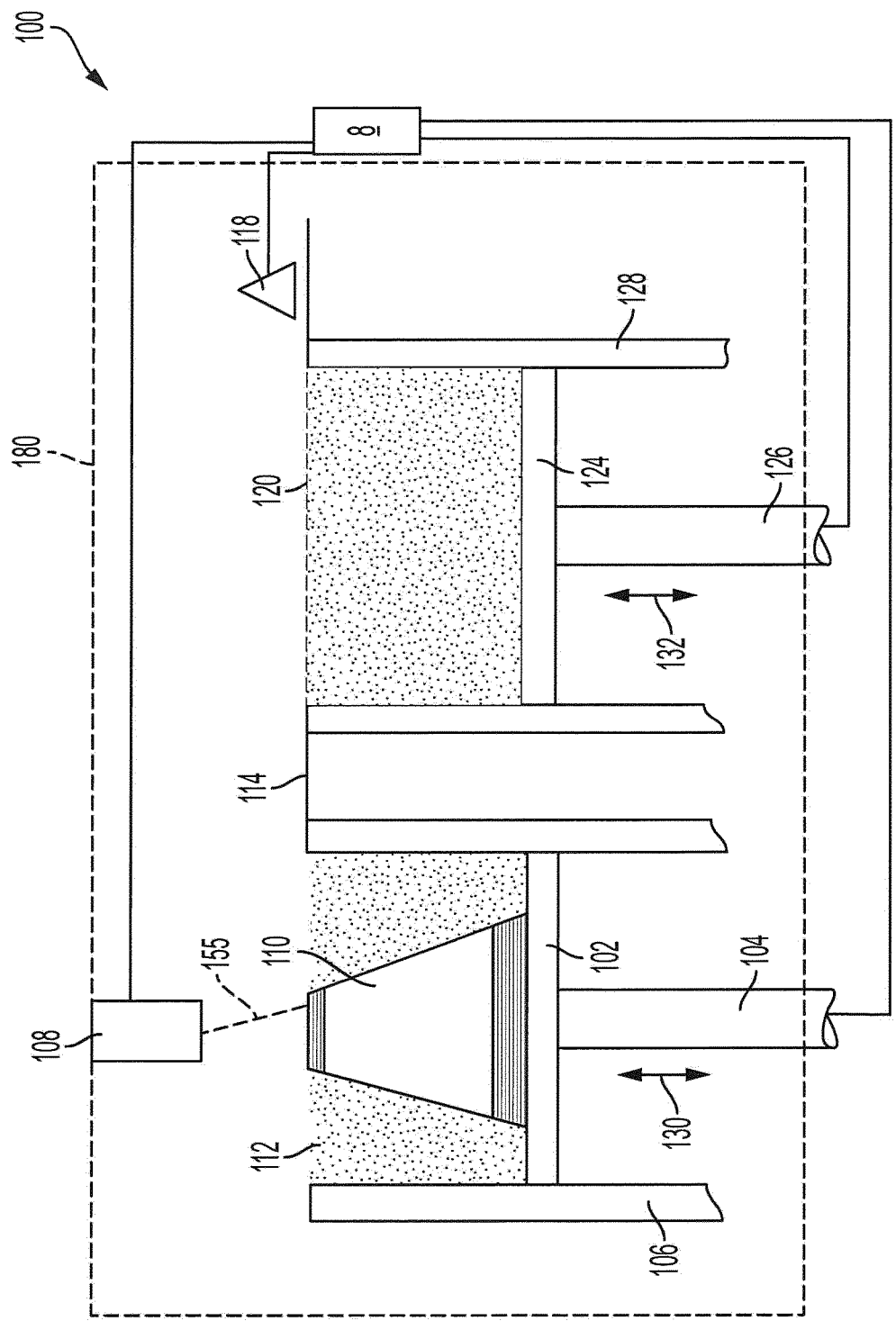
FIG. 1 is a schematic view of an example embodiment of an AM apparatus into which the inventive concept may be implemented.

FIG. 1 shows a schematic view of an example embodiment of an AM apparatus into which the inventive concept may be implemented. In the apparatus 100 three-dimensional articles 110 maybe formed layer by layer by successive fusion of selected areas of a powder layers, which selected areas correspond to successive layers of the three-dimensional article. The apparatus 100 comprises a process chamber 180 and a build tank 106 arranged inside the process chamber 180.

Further, the apparatus 100 comprises a powder tank 128, a powder distributor 118 and a build table 102 for receiving powder from the powder distributor 118. The build table 102 is arranged inside the build tank 106. The build table 102 has a top surface for receiving powder from the powder distributor 118. The top surface of the build table 102 is preferably flat and horizontal and is faced upwardly in a vertical direction.

The build table 102 comprises means for movement of the build table 102 relative to the build tank 106 in the vertical direction 130, such as a servo motor equipped with a gear, adjusting screws, etc. The powder distributor 118 is arranged to lay down a thin layer of the powder material on the build table 102 or powder bed 112 in the build tank 106. During a work cycle the build table 102 will be lowered for maintaining the position of the top surface of the powder bed relative to the build tank 106 when adding powder layers to the powder bed 112.

The apparatus 1 has an energy beam source 108 arranged for creating an energy beam 155. The energy beam 155 is used for melting the selected areas of the powder 112. The energy beam 155 is scanned over the surface of the current powder layer for melting the selected areas. The selected areas of each layer can be based on a model dividing the article to be manufactured in successive layers or slices. The model may be a computer model generated by a CAD (Computer Aided Design) tool.

The energy beam source 108 may be an electron beam source. The electron beam source can be designed in a way well known to the person skilled in the art. The electron beam source may have an electron gun with an emitter electrode which is connected to a high voltage circuit and a current source for accelerating electrons and releasing electrons from the emitter electrode. These electrons form the electron beam. The electron beam source has also focusing coils and deflection coils for directing the electron beam to various positions of the build layer surface.

The process chamber 180 can be arranged for maintaining a vacuum environment by means of a vacuum system, which may comprise a turbomolecular pump, a scroll pump, an ion pump and one or more valves. Such a vacuum system is known to the person skilled in the art and is not further described or illustrated herein.

In another embodiment of the apparatus 100, any other suitable energy beam source 108 can be used. For example, a laser beam source. The laser beam source can be designed in a way well known to the person skilled in the art. The laser beam source may have a laser emitter for emitting photons. These photons form the laser beam. The laser beam source has also focusing units and deflection units for directing the laser beam to various positions of the build layer surface. The focusing units can comprise lenses and the deflection units can comprise mirrors.

The build tank 106 may be a cylinder and the build table 102 is arranged inside the cylinder. The cylinder is a body having a cylinder-shaped cavity for receiving the build table 102, preferably a substantially circular cylinder with an inner diameter. Optionally, the outer peripheral surface of the cylinder can also be circular cylinder-shaped. The build table 102 is displaceable relative to the cylinder in an axial direction denoted by arrow 130.

Powder material to be distributed as powder layers onto the build table 102 in the build tank 106 is stored in a powder tank 128. The powder distributor 118 picks up a predetermined amount of powder from the powder tank 128 and distributes the powder onto the build table 102 in the build tank 106. The predetermined amount of powder picked up by the powder distributor 118 is determined by the amount a powder raised above a powder table 114. The predetermined amount of powder is regulated by a level of a powder tank table 124. The powder tank table 124 can be moved in a vertical direction up and down denoted by arrow 132.

A powder layer thickness of a new powder layer in the build tank 106 is determined by how much the build table 102 is lowered down into the build tank 106 relative to the powder table 114.

An area of the build table 102 may be equal to an area of the powder tank table 124.

A control unit 8 may control the movement of the powder distributor 118, the powder tank table 124, the build table 102, the energy beam source 108. The control unit 8 may also comprise the scheme for steering the high energy beam in order to manufacture the three-dimensional article according to CAD data.

Figure 2:
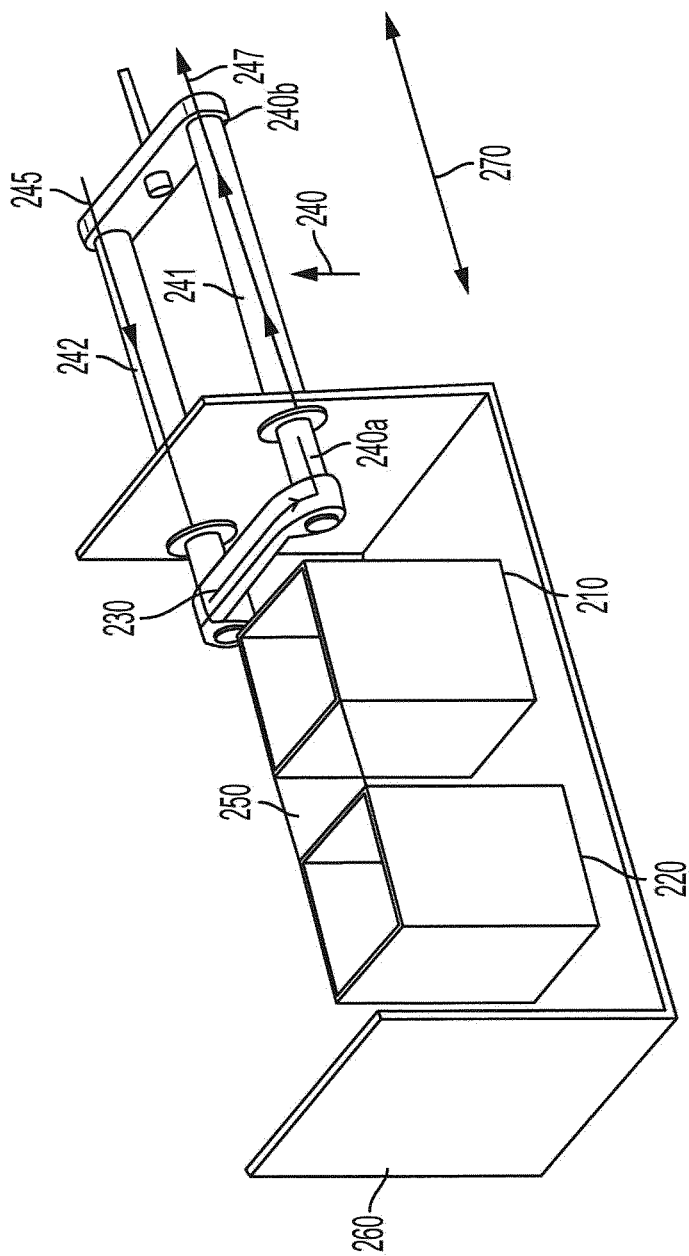
FIG. 2 is a perspective top view showing a first example embodiment of the present invention.

FIG. 2 is a perspective top view showing a first example embodiment of the present invention. It should be understood that all components not described here separately relative to FIG. 2 may be provided in substantially the same manner (i.e., configuration) as in FIG. 1 and/or otherwise. In FIG. 2 it is depicted a powder tank 210, a build tank 220, a support structure 240 and a powder distributor 230 attached to the support structure 240. Powder material in the powder tank is elevated essentially in the same manner as the powder tank in FIG. 1, i.e., a powder tank table (not shown) adapted to be movable in a vertical direction relative to a powder table 250. The same applies to the build tank 220. Here a build table (not shown) is movable in a vertical direction relative to the powder table 250 essentially in the same manner as described in relation to FIG. 1. The powder table 250 connects powder transfer from the powder tank 210 to the build tank 220. A process chamber 160, which in FIG. 2 is an open structure for illustrative purpose only, is enclosing the top surface of the build tank 220 and the powder tank 210 and is.

The powder distributor 230 is attached to the support structure 240, which support structure is passing through the process chamber 160. A first end of the support structure 240a is attached to the powder distributor 230. The powder distributor is always inside the process chamber 260. A second end 240b is connectable to a cooling/heating media supply. The support structure 240 is adapted to transport the cooling/heating media to a from the powder distributor. In the depicted example embodiment in FIG. 2 the support structure comprises a first leg 241 and a second leg 242. Cooling/heating media, which can be in the form of a cooling/heating gas or a cooling/heating liquid, is transported to the powder distributor via the second leg 242. The second leg may comprise one or a plurality of internal channels through which the cooling/heating media may be transported. The powder distributor 230 may via one or a plurality of inlets be coupled to the internal channels of the second leg 242, for further transport of the cooling/heating media through the powder distributor 230. The powder distributor 230 may have one or a plurality of internal channels going back and forth for effectively cooling/heating the powder distributor 230. The internal channels of the powder distributor 230 may have one or a plurality of outlets connected to the first leg 241 of the support structure 240, for transport of the cooling/heating media away from the powder distributor 230. Cooling/heating media inlet 245 is provided in the second leg 242 and cooling/heating media outlet is provided and the first leg 241.

The support structure is a rigid structure. In FIG. 2, the support structure 240 is moving back and forth along a straight line depicted by the arrow 270. The cooling/heating media may be connected to the second end 240b of the support structure with a flexible inlet and a flexible outlet connecting the second end of the support structure 240b with a cooling/heating media reservoir (not shown) and possibly also a heat exchanger (not shown). The cooling/heating media reservoir may be a gas tank or a liquid tank. An actuator (not shown) may be used for moving the support structure back and forth along the straight line. In certain embodiments, the actuator is located outside the process/build chamber.

The support structure and the powder distributor may be made of any pure metal or alloy. The support structure is on the one hand moving the powder distributor back and forth over the powder tank and the build tank for the formation of powder layers and on the other hand transporting the cooling/heating media from an outside cooling/heating reservoir to the powder distributor. The support structure goes through the process chamber 260. In the case the process chamber is a vacuum chamber, the through holes need to be vacuum sealed to the support structure.

In an example embodiment the powder distributor may be arranged with one or a plurality of sensors or measuring devices. Sensor cables and or measuring device cables may run in the same internal channels as the cooling/heating media or one or a plurality of separate internal channels of the support structure 240. An example of a sensor is a temperature sensor for measuring the temperature of a build surface or a sensor for measuring the topography of the powder layer. Exemplary sensors may be provided also for the embodiments of FIGS. 3 and 4.

In the example embodiment in FIG. 2 a feedthrough of the support structure in the process chamber is only taking place on one side. Alternatively the feedthrough may also be on the other side of the process chamber. The feedthrough may also serve the purpose of supporting the support structure in x, y and z direction Alternatively, one or a plurality of separate support structures inside and/or outside the process chamber may be used.

In FIG. 2 the support structure is illustrated as having a first and a second leg 241, and 242 respectively. However, any number of legs may be used in the support structure for attaching to the powder distributor. Some of the support structures may just be a support structure without feeding cables and/or cooling/heating media, some may be for cooling/heating media and others for cables to and from the sensors on the powder distributor only.

The cooling/heating media may also be used not only to cool the powder distributor but also to cool the build from above. For instance, if a cold gas or liquid is fed into the powder distributor, the powder distributor may be arranged above a certain position of the build area in order to cool down the top surface. By moving the powder distributor over the top surface while transferring cooling/heating media inside the powder distributor, the top surface may be scanned and thereby cooled down from above. The cooling/heating from above may be used during a build where the temperature has reached a too high working temperature. Instead of inserting a cooling/heating gas and thereby destroying the vacuum conditions the powder distributor with its cooling/heating features may be used to speed up the cooling/heating of the build from above. In such a way the manufacturing time may be decreased since any possible too hot condition may be removed by the cooling/heating powder distributor moving over the build area. This is true relative to any of the embodiments described herein, with reference not only to FIG. 2, but also FIGS. 3-4.

The cooling/heating of the powder distributor may also be used for making sure no powder material is stuck onto the powder distributor just because it is too hot. A cool powder distributor is less likely to attract powder material than a hot powder distributor. With the cooled powder distributor, the powder distributor may be kept at a more narrow temperature interval which is advantageous for keeping the design of the powder distributor more constant compared to a non-cooled powder distributor. This is true relative to any of the embodiments described herein, with reference not only to FIG. 2, but also FIGS. 3-4.

Figure 3:
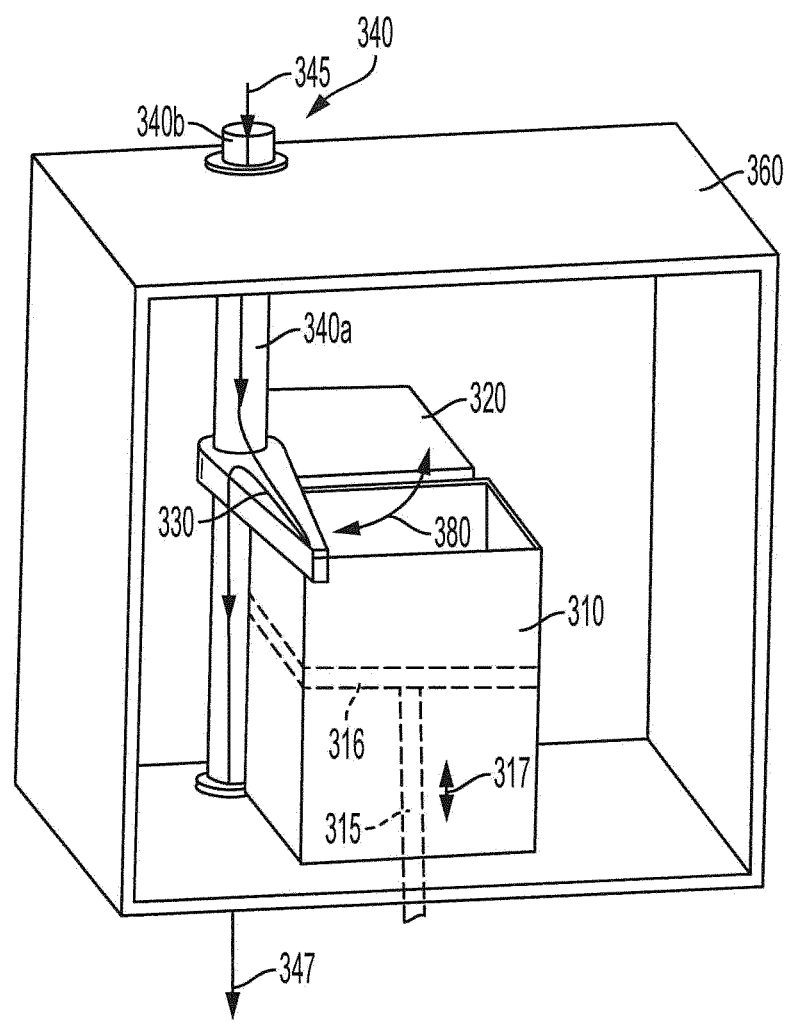
FIG. 3 is a perspective top view showing a second example embodiment of the present invention.

FIG. 3 is a perspective top view showing a second example embodiment of the present invention. It should be understood that all components not described here separately relative to FIG. 3 may be provided in substantially the same manner (i.e., configuration) as in either of FIGS. 1-2 and/or some combination thereof. In FIG. 3 specifically the support structure 340 is a rotating axle onto which the powder distributor 330 is attached. The powder distributor 330 is extending perpendicular from a central axis of the support structure. As the support structure is rotating around its central axis the powder distributor is making a rotational movement first over a powder tank 310 for collecting a predetermined amount of powder and then over the build tank 320 for distributing the powder material for forming a powder layer. Inside the support structure 340 it is provided one or a plurality of channels for allowing transport of cooling/heating media from outside the process chamber 360 via the support structure 340 to the powder distributor 330. The powder distributor 330 may in turn be provided with one or a plurality of internal channels for allowing transport of the cooling/heating media. The cooling/heating media has in this embodiment an inlet 345 in the sop section of the process chamber 360 and an outlet 347 in the bottom of the process chamber 360. A first feedthrough is provided at a top section of the process chamber for the support structure 340. A second feedthrough is provided at the bottom of the process chamber 360 for the support structure 340. A first portion of the support structure 340b is always provided outside the process chamber. The first portion is connectable to the cooling/heating media reservoir. The second section 340a is always provided inside the process chamber 360 and is provided with the powder distributor 330. Internal channels in the support structure 340 is connected to internal structure of the powder distributor 330 allowing transfer of cooling/heating media from an inlet 345 through the support structure via the powder distributor to an outlet 347. In an alternative embodiment the top section is provided with the inlet of the cooling/heating media and the outlet of the cooling/heating media. Arrow 380 indicates the movement of the powder distributor 330 over the powder tank and the build tank 320. Dotted lines in the powder tank 310 denoted a powder tank table 316, a powder tank table support 315 and a direction of movement 317.

Figure 4:
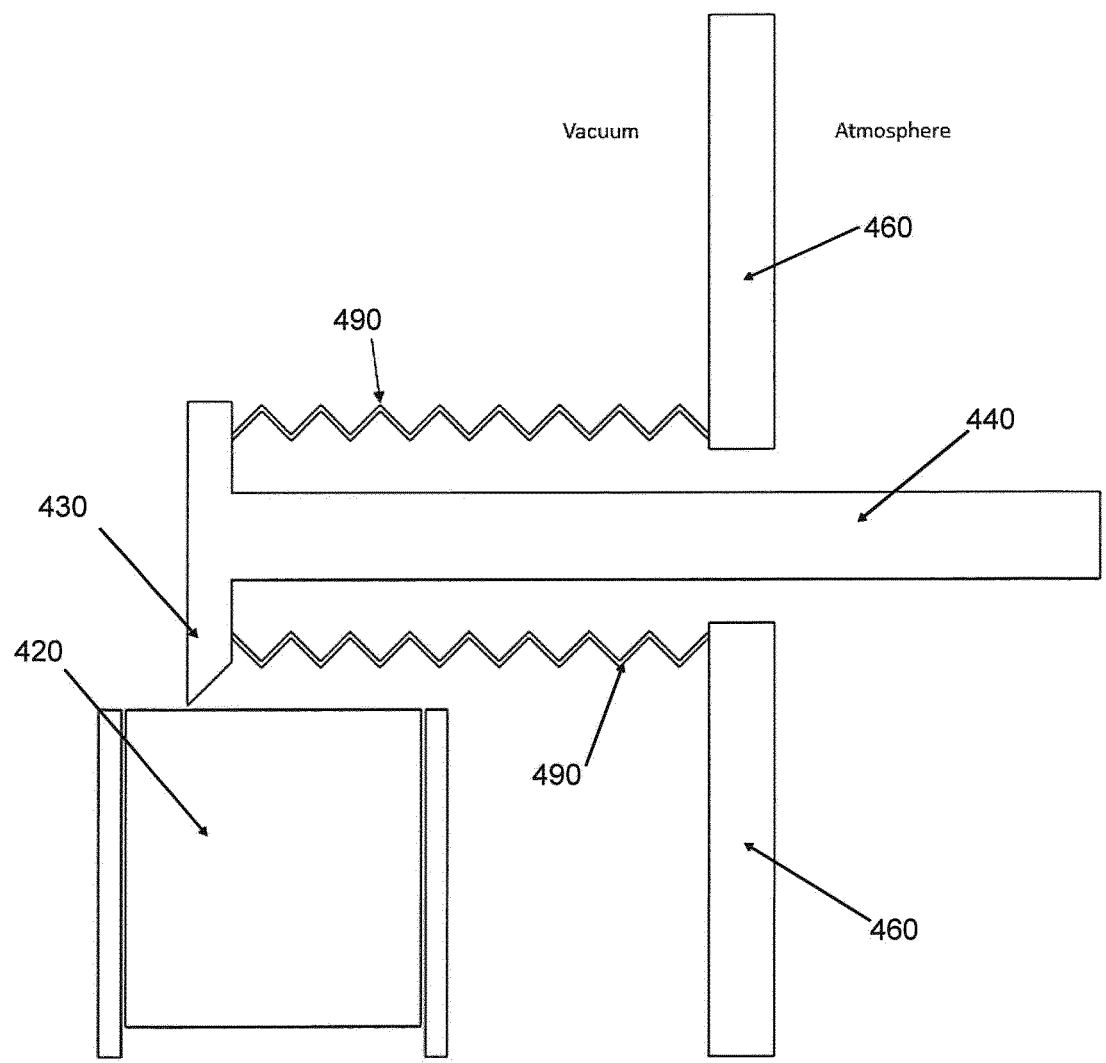
FIG. 4 is a side view showing a third example embodiment of the present invention.

FIG. 4 is a side view showing a third example embodiment of the present invention. It should be understood that all components not described here separately relative to FIG. 4 may be provided in substantially the same manner (i.e., configuration) as in FIG. 1 as described elsewhere herein. In FIG. 4 specifically, the support structure 440 is a rigid structure onto which the powder distributor 430 is attached. The powder distributor 430 may, in certain instances, extend perpendicular from a central or longitudinal axis of the support structure. The support structure 440 may be configured, in certain embodiments, to move back and forth in a linear fashion (much like the structure 240 in FIG. 2), such that the powder distributor 430 translates over a top of at least the build tank 420. An actuator (not shown; generally external to the build/process chamber) may be used for moving the support structure 440 back and forth in the desired manner. The support structure and the powder distributor may be made of any pure metal or alloy. A powder tank (not shown) may be also provided; if provided it may be substantially the same as the powder tank 210 of FIG. 2. Powder material in the powder tank may also be elevated essentially in the same manner as in the powder tank of FIG. 1. The same applies to the build tank 420.

As mentioned, in FIG. 4 the powder distributor 430 is attached to the support structure 440. The powder distributor 430 is always inside the process chamber 460 and its associated walls. The support structure 440 passages through at least one wall of the process chamber 460, as illustrated. In the case the process chamber 460 (as illustrated) is a vacuum chamber, any through hole(s) for the support structure 440 passing through its walls will need to be vacuum sealed to the support structure.

Cooling/heating media, which can be in the form of a cooling/heating gas or a cooling/heating liquid, may be—in the embodiment of FIG. 4—transported to the powder distributor 430 via a bellows assembly 490 attached to the powder distributor and a wall of the process chamber 460. As illustrated, the bellows assembly 490 substantially surrounds the support structure 440. In certain instances, the bellows assembly 490 may be configured to provide a vacuum internal to the bellows assembly and surrounding the support structure 440, separate from any vacuum provided generally within the process chamber 460. Atmospheric conditions may exist outside the process chamber, as in FIG. 1 and other embodiments described herein.

It should be understood that the cooling/heating media is injected within the bellows assembly 490 from a cooling/heating media inlet surrounding and/or otherwise adjacent to the support structure 440, specifically where the support structure passes through the process chamber 460 wall. A cooling/heating media tank (not illustrated, but understood with reference to other figures and embodiments described herein) may also be provided. As the support structure 440 moves back and forth in a manner analogous to that described relative to FIG. 2, the bellows assembly 490 may be configured to expand and contract, such that a vacuum is maintained relative to the support structure and the powder distributor 430 at all times. Cooling/heating media outlet(s) may be provided at an end of the bellows assembly 490 adjacent the powder distributor 430. In one embodiment, the bellows assembly 490 may provide support for the distributor 430 without utilization of a separate support structure 440.

In contrast to the embodiments of FIGS. 2-3, it should also be understood that in the embodiment of FIG. 4 the cooling/heating media is provided outside the support structure, behind the powder distributor, and within a separately provided (optionally vacuum-creating) bellows assembly. It should be noted that the feedthrough of the support structure 440 and/or any portion of the bellows assembly 490 relative to the process chamber (and associated walls) occurs on only one side/in one location. This may occur at any desirable location on the process chamber, and the feedthrough may also serve the purpose of supporting the support structure in the x, y, and/or z-direction. Alternatively, one or a plurality of separate support structures (not illustrated) inside and/or outside the process chamber may be used. One or more internal channels may also be provided within the bellows assembly and/or the powder distributor; in other instances, no internal channels may be provided. In all configurations of the embodiment of FIG. 4, though, any transport of cooling/heating media (through channels or otherwise) occurs external to the support structure illustrated.

An exemplary and non-limiting advantage provided by the bellows assembly/structure is that the passage(s) through the process chamber (for receipt of the support structure component(s) need not be sealed with the degree of precision described elsewhere herein, for example with reference to the embodiments of FIGS. 2 and 3. This is because the bellows assembly itself functions as a seal, providing a vacuum environment within its enclosed volume, which includes the support structure component(s) and/or any associated tubes or internal channels for distribution/transport of the cooling/heating media. As a result, in certain embodiments, the support structure component(s) (e.g., any rods holding the powder distributor or analogous components as described elsewhere herein) may pass through large holes in the process chamber. Integral sealing around those holes may be eliminated.

In any of these and still other embodiments, the bellows assembly or structure may be constructed of a metal material. This enables the seal formed around and by the bellows to be more or less insensitive to temperature. At a minimum, the bellows is configured to resist higher temperature than a conventional seal through a process chamber wall or the like.

In another aspect of the invention there is provided a program element configured and arranged when executed on a computer (e.g., via a computer program) to implement the methods and to configure the apparatuses described herein. The program element may be installed in a non-transitory computer readable storage medium. The computer readable storage medium may be the control unit 8 or on another control unit. The computer readable storage medium and the program element, which may comprise computer-readable program code portions embodied therein, may further be contained within a computer program product or a computer program, as described previously.

As mentioned, various embodiments of the present invention may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (Fe-RAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory VRAM, cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like, as have been described elsewhere herein. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Various embodiments are described below with reference to block diagrams and flowchart illustrations of apparatuses, methods, systems, and computer program products. It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

Figure 5:
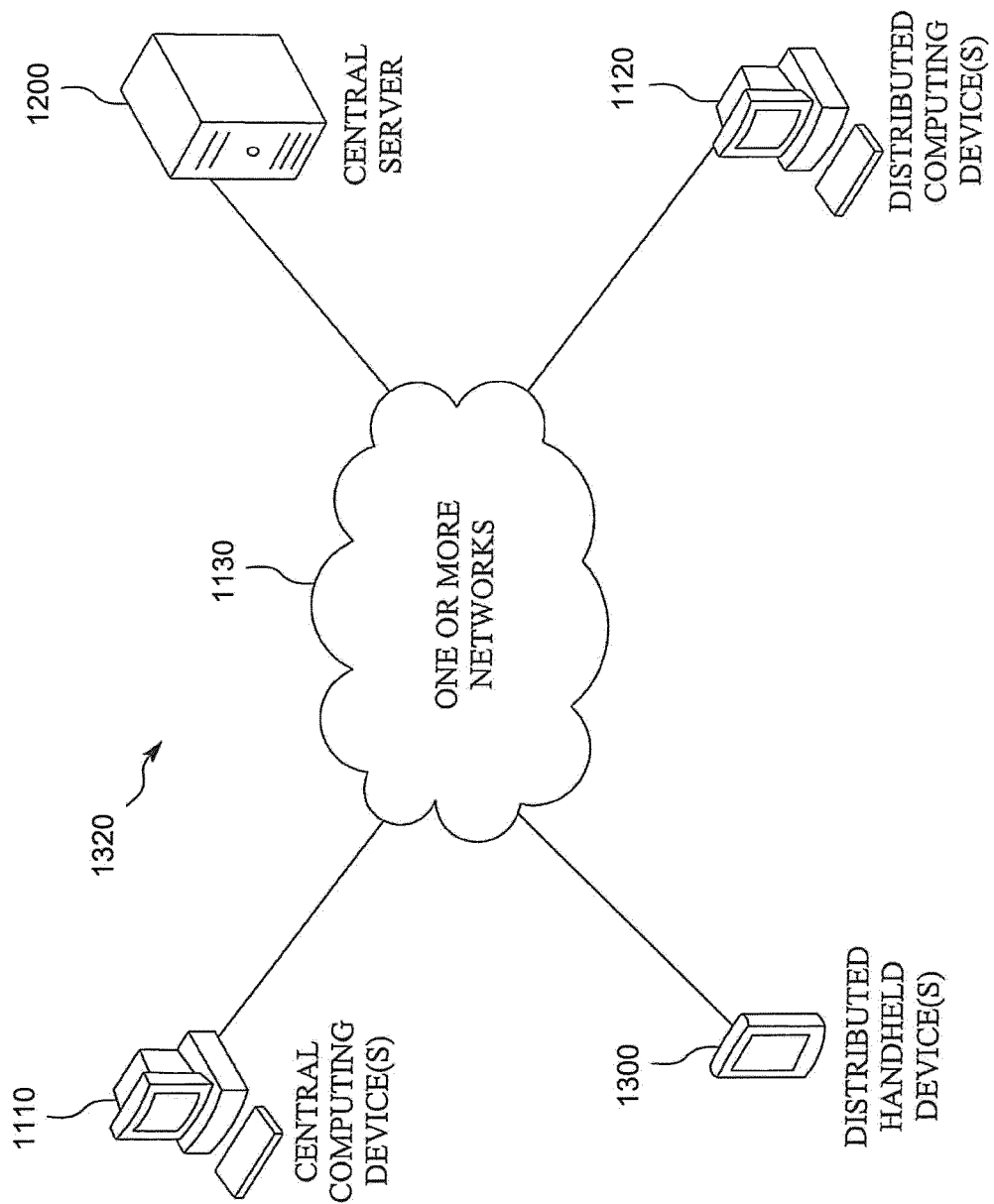
FIG. 5 is a block diagram of an exemplary system according to various embodiments.

FIG. 5 is a block diagram of an exemplary system 1320 that can be used in conjunction with various embodiments of the present invention. In at least the illustrated embodiment, the system 1320 may include one or more central computing devices 1110, one or more distributed computing devices 1120, and one or more distributed handheld or mobile devices 1300, all configured in communication with a central server 1200 (or control unit) via one or more networks 1130. While FIG. 5 illustrates the various system entities as separate, standalone entities, the various embodiments are not limited to this particular architecture.

According to various embodiments of the present invention, the one or more networks 1130 may be capable of supporting communication in accordance with any one or more of a number of second-generation (2G), 2.5G, third-generation (3G), and/or fourth-generation (4G) mobile communication protocols, or the like. More particularly, the one or more networks 130 may be capable of supporting communication in accordance with 2G wireless communication protocols IS-136 (TDMA), GSM, and IS-95 (CDMA). Also, for example, the one or more networks 1130 may be capable of supporting communication in accordance with 2.5G wireless communication protocols GPRS, Enhanced Data GSM Environment (EDGE), or the like. In addition, for example, the one or more networks 130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system 1320 may be configured to communicate with one another in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Although the device(s) 1110-3100 are illustrated in FIG. 5 as communicating with one another over the same network 1130, these devices may likewise communicate over multiple, separate networks.

According to one embodiment, in addition to receiving data from the server 1200, the distributed devices 1110, 1120, and/or 1300 may be further configured to collect and transmit data on their own. In various embodiments, the devices 1110, 1120, and/or 1300 may be capable of receiving data via one or more input units or devices, such as a keypad, touchpad, barcode scanner, radio frequency identification (RFID) reader, interface card (e.g., modem, etc.) or receiver. The devices 1110, 1120, and/or 1300 may further be capable of storing data to one or more volatile or non-volatile memory modules, and outputting the data via one or more output units or devices, for example, by displaying data to the user operating the device, or by transmitting data, for example over the one or more networks 1130.

In various embodiments, the server 1200 includes various systems for performing one or more functions in accordance with various embodiments of the present invention, including those more particularly shown and described herein. It should be understood, however, that the server 1200 might include a variety of alternative devices for performing one or more like functions, without departing from the spirit and scope of the present invention. For example, at least a portion of the server 1200, in certain embodiments, may be located on the distributed device(s) 1110, 1120, and/or the handheld or mobile device(s) 1300, as may be desirable for particular applications. As will be described in further detail below, in at least one embodiment, the handheld or mobile device(s) 1300 may contain one or more mobile applications 1330 which may be configured so as to provide a user interface for communication with the server 1200, all as will be likewise described in further detail below.

Figure 6:
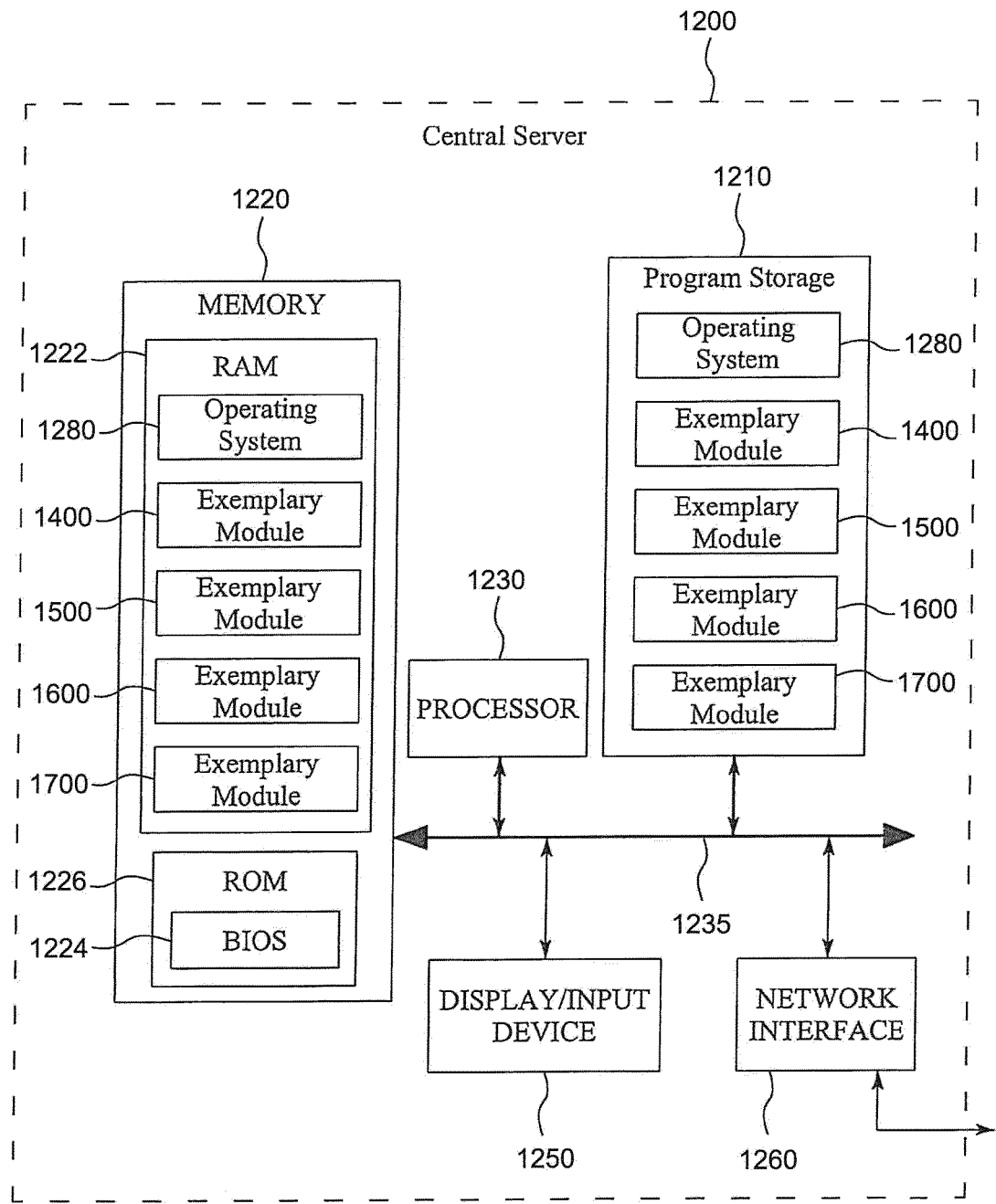
FIG. 6 is a schematic block diagram of an exemplary server according to various embodiments.

FIG. 6 is a schematic diagram of the server 1200 according to various embodiments. The server1 200 includes a processor 1230 that communicates with other elements within the server via a system interface or bus 1235. Also included in the server 1200 is a display/input device 1250 for receiving and displaying data. This display/input device 1250 may be, for example, a keyboard or pointing device that is used in combination with a monitor. The server 1200 further includes memory 1220, which typically includes both read only memory (ROM) 1226 and random access memory (RAM) 1222. The server's ROM 1226 is used to store a basic input/output system 1224 (BIOS), containing the basic routines that help to transfer information between elements within the server 1200. Various ROM and RAM configurations have been previously described herein.

In addition, the server 1200 includes at least one storage device or program storage 1210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 1210 are connected to the system bus 1235 by an appropriate interface. The storage devices 1210 and their associated computer-readable media provide nonvolatile storage for a personal computer. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Although not shown, according to an embodiment, the storage device 1210 and/or memory of the server 1200 may further provide the functions of a data storage device, which may store historical and/or current delivery data and delivery conditions that may be accessed by the server 1200. In this regard, the storage device 1210 may comprise one or more databases. The term "database" refers to a structured collection of records or data that is stored in a computer system, such as via a relational database, hierarchical database, or network database and as such, should not be construed in a limiting fashion.

A number of program modules (e.g., exemplary modules 1400-1700) comprising, for example, one or more computer-readable program code portions executable by the processor 1230, may be stored by the various storage devices 1210 and within RAM 1222. Such program modules may also include an operating system 1280. In these and other embodiments, the various modules 1400, 1500, 1600, 1700 control certain aspects of the operation of the server 1200 with the assistance of the processor 1230 and operating system 1280. In still other embodiments, it should be understood that one or more additional and/or alternative modules may also be provided, without departing from the scope and nature of the present invention.

In various embodiments, the program modules 1400, 1500, 1600, 1700 are executed by the server 1200 and are configured to generate one or more graphical user interfaces, reports, instructions, and/or notifications/alerts, all accessible and/or transmittable to various users of the system 1320. In certain embodiments, the user interfaces, reports, instructions, and/or notifications/alerts may be accessible via one or more networks 1130, which may include the Internet or other feasible communications network, as previously discussed.

In various embodiments, it should also be understood that one or more of the modules 1400, 1500, 1600, 1700 may be alternatively and/or additionally (e.g., in duplicate) stored locally on one or more of the devices 1110, 1120, and/or 1300 and may be executed by one or more processors of the same. According to various embodiments, the modules 1400, 1500, 1600, 1700 may send data to, receive data from, and utilize data contained in one or more databases, which may be comprised of one or more separate, linked and/or networked databases.

Also located within the server 1200 is a network interface 1260 for interfacing and communicating with other elements of the one or more networks 1130. It will be appreciated by one of ordinary skill in the art that one or more of the server 1200 components may be located geographically remotely from other server components. Furthermore, one or more of the server 1200 components may be combined, and/or additional components performing functions described herein may also be included in the server.

While the foregoing describes a single processor 1230, as one of ordinary skill in the art will recognize, the server 1200 may comprise multiple processors operating in conjunction with one another to perform the functionality described herein. In addition to the memory 1220, the processor 1230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface, as will be described in further detail below. The user input interface, in turn, can comprise any of a number of devices allowing the entity to receive data from a user, such as a keypad, a touch display, a joystick or other input device.

Still further, while reference is made to the "server" 1200, as one of ordinary skill in the art will recognize, embodiments of the present invention are not limited to traditionally defined server architectures. Still further, the system of embodiments of the present invention is not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), similar electronic devices, or handheld portable devices, collaborating with one another to provide the functionality described herein in association with the server 200 may likewise be used without departing from the spirit and scope of embodiments of the present invention.

According to various embodiments, many individual steps of a process may or may not be carried out utilizing the computer systems and/or servers described herein, and the degree of computer implementation may vary, as may be desirable and/or beneficial for one or more particular applications.

Figure 7:
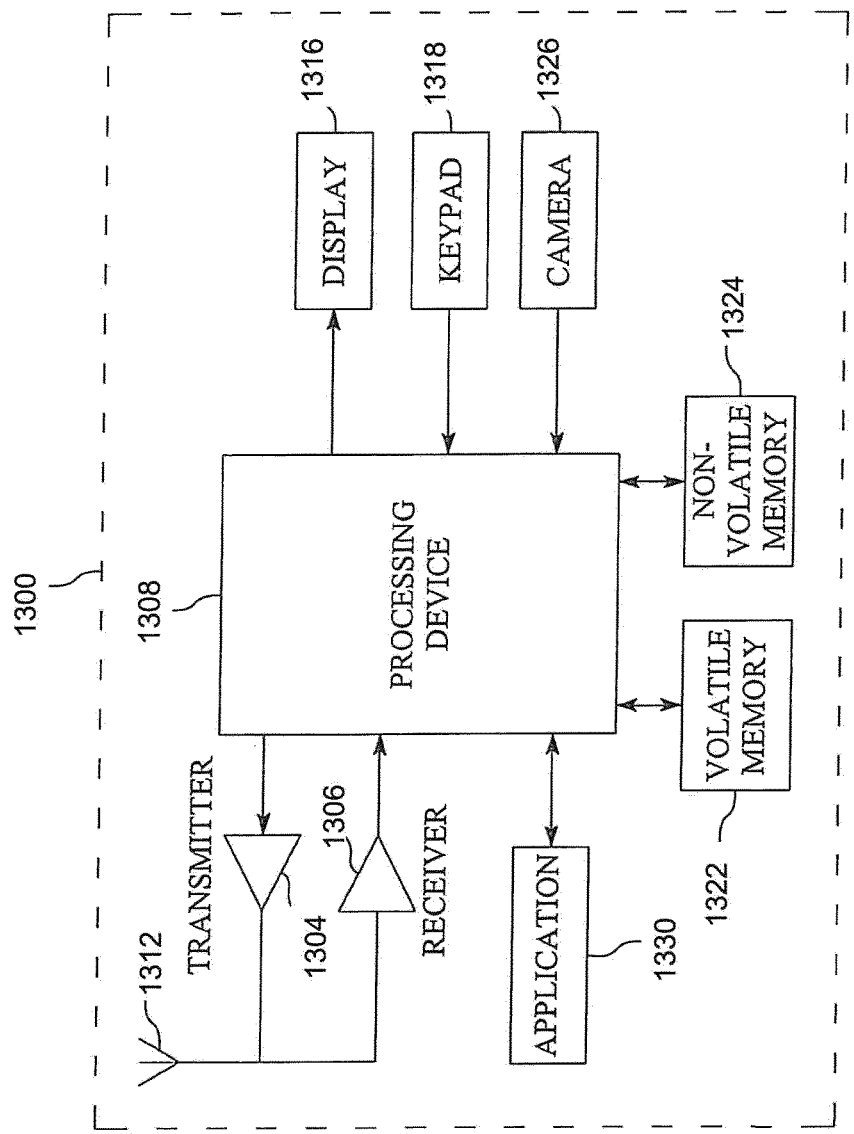
FIG. 7 is a schematic block diagram of an exemplary mobile device according to various embodiments.

FIG. 7 provides an illustrative schematic representative of a mobile device 1300 that can be used in conjunction with various embodiments of the present invention. Mobile devices 1300 can be operated by various parties. As shown in FIG. 7, a mobile device 1300 may include an antenna 1312, a transmitter 1304 (e.g., radio), a receiver 1306 (e.g., radio), and a processing element 1308 that provides signals to and receives signals from the transmitter 1304 and receiver 1306, respectively.

The signals provided to and received from the transmitter 1304 and the receiver 1306, respectively, may include signaling data in accordance with an air interface standard of applicable wireless systems to communicate with various entities, such as the server 1200, the distributed devices 1110, 1120, and/or the like. In this regard, the mobile device 1300 may be capable of operating with one or more air interface standards, communication protocols, modulation types, and access types. More particularly, the mobile device 1300 may operate in accordance with any of a number of wireless communication standards and protocols. In a particular embodiment, the mobile device 1300 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile device 1300 may according to various embodiments communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The mobile device 300 can also download changes, add-ons, and updates, for instance, to its firmware, software (e.g., including executable instructions, applications, program modules), and operating system.

According to one embodiment, the mobile device 1300 may include a location determining device and/or functionality. For example, the mobile device 1300 may include a GPS module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The mobile device 1300 may also comprise a user interface (that can include a display 1316 coupled to a processing element 1308) and/or a user input interface (coupled to a processing element 1308). The user input interface can comprise any of a number of devices allowing the mobile device 300 to receive data, such as a keypad 1318 (hard or soft), a touch display, voice or motion interfaces, or other input device. In embodiments including a keypad 1318, the keypad can include (or cause display of) the conventional numeric (0-9) and related keys (#, *), and other keys used for operating the mobile device 1300 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 1300 can also include volatile storage or memory 1322 and/or non-volatile storage or memory 1324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database mapping systems, data, applications, programs, program modules, scripts, source code, object code, byte code, compiled code, interpreted code, machine code, executable instructions, and/or the like to implement the functions of the mobile device 1300.

The mobile device 1300 may also include one or more of a camera 1326 and a mobile application 1330. The camera 1326 may be configured according to various embodiments as an additional and/or alternative data collection feature, whereby one or more items may be read, stored, and/or transmitted by the mobile device 1300 via the camera. The mobile application 1330 may further provide a feature via which various tasks may be performed with the mobile device 1300. Various configurations may be provided, as may be desirable for one or more users of the mobile device 1300 and the system 1320 as a whole.

It is to be understood that the present invention is not limited to the embodiments described above and illustrated in the drawings; rather, the skilled person will recognize that many changes and modifications may be made within the scope of the appended claims.

The invention claimed is:

1. An additive manufacturing apparatus for additive manufacturing of three dimensional objects by selectively solidifying a powder material layer by layer in a process chamber, the apparatus comprising:
   a powder distributor movable across a build area of a build tank and configured for applying a layer of powder material thereon;
   a solidification device configured for selectively solidifying the applied powder layer at positions corresponding to a cross section of the object to be manufactured;
   a control unit adapted to manipulate the powder distributor and the solidification device to repeat the steps of applying and selectively solidifying until the object is completed; and
   at least one support structure configured for supporting said powder distributor and connected or connectable to a cooling/heating media supply positioned outside said process chamber, said support structure being configured for transporting cooling/heating media to and from said powder distributor,
   wherein one or more internal channels are provided inside the support structure for allowing transport of said cooling/heating media from outside the process chamber via the support structure to the powder distributor,
   wherein one or more internal channels are provided inside the powder distributor for allowing transport of said cooling/heating media, wherein the cooling/heating media is at least one of a gas or liquid.

2. The additive manufacturing apparatus according to claim 1, wherein said support structure for supporting said powder distributor has at least a first portion inside said process chamber connected to said powder distributor and at least a second portion outside said process chamber connectable and/or connected to said cooling/heating media supply.

3. The additive manufacturing apparatus according to claim 1, wherein said process chamber is a vacuum chamber.

4. The additive manufacturing apparatus according to claim 3, wherein said powder is solidified by means of at least one electron beam source.

5. The additive manufacturing apparatus according to claim 1, wherein said support structure is arranged to be moved back and forth for moving said powder distributor over said build area back and forth along a straight line.

6. The additive manufacturing apparatus according to claim 1, wherein said support structure is arranged to be rotated for rotating said powder distributor over said build area.

7. The additive manufacturing apparatus according to claim 1, wherein said cooling/heating media is at least one of a gas or liquid.

8. The additive manufacturing apparatus according to claim 1, wherein said cooling/heating media is transported to and from said powder distributor by a pump.

9. The additive manufacturing apparatus according to claim 1, further comprising at least one guide member provided outside said build chamber for guiding said support structure along a straight line and means for moving said support structure along said straight line.

10. The additive manufacturing apparatus according to claim 6, further comprising at least one bearing outside said build chamber and means for rotating said support structure.

11. A method for additive manufacturing of three-dimensional objects by selectively solidifying a powder material layer by layer in a process chamber, said method comprising the steps of:
   a. applying a layer of powder material within a build area of a build tank by means of a powder distributor moving across the build area,
   b. selectively solidifying the applied powder material in said build tank at positions corresponding to a cross-section of an object to be manufactured, by means of a solidification device,
   c. repeating the steps of applying and selectively solidifying until the object is completed by a control unit adapted to manipulate the powder distributor and the solidification device, and
   d. connecting a cooling/heating media supply provided outside of said process chamber to at least one support structure for supporting said powder distributor where said support structure is adapted for transporting said cooling/heating media to and from said powder distributor,
   wherein one or more internal channels are provided inside the at least one support structure for allowing transport of said cooling/heating media from outside the process chamber via the at least one support structure to the powder distributor, wherein one or more internal channels are provided inside the powder distributor for allowing transport of said cooling/heating media, wherein the cooling/heating media is at least one of a gas or liquid.

12. The method according to claim 11, further comprising the steps of
providing a first portion of said support structure connected to said powder distributor inside said process chamber, and
providing a second portion of said support structure connected to said cooling/heating media supply outside said process chamber.

13. The method according to claim 11, wherein said process chamber is a vacuum chamber.

14. The method according to claim 11, wherein said powder is solidified by means of at least one electron beam source.

15. The method according to claim 11, further comprising the step of arranging said support structure to be movable back and forth for moving said powder distributor back and forth over said build area along a straight line.

16. The method according to claim 11, further comprising the step of
arranging said support structure rotatable along its central axis for rotating said powder distributor over said build area.

17. The method according to claim 11, wherein said cooling/heating media is one of a liquid or a gas.

18. The method according to claim 11, further comprising the step of transporting said cooling/heating media to and from said powder distributor by a pump arranged outside said process chamber.

19. The method according to claim 11, further comprising the steps of
arranging a guide member outside said process chamber for guiding said support structure along a straight line, and
arranging means for moving said support structure along said straight line outside said process chamber.

* * * * *